April 27, 1943.                H. HAEBLER                2,317,759
                            LEAD STORAGE BATTERY
                           Filed Jan. 25, 1940                4 Sheets-Sheet 1
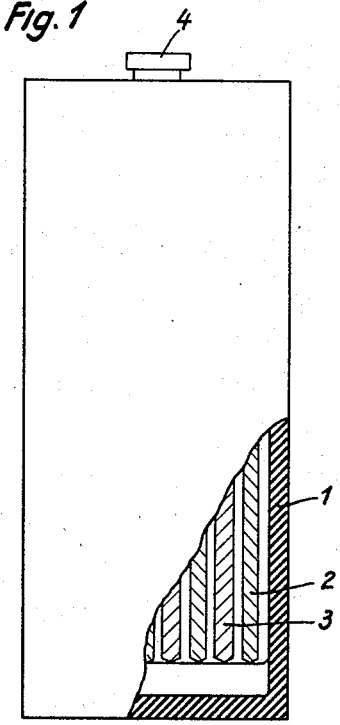
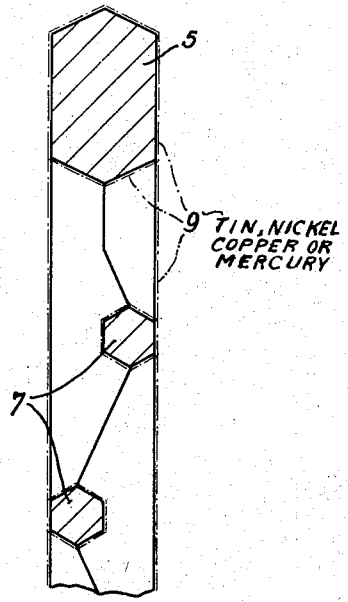
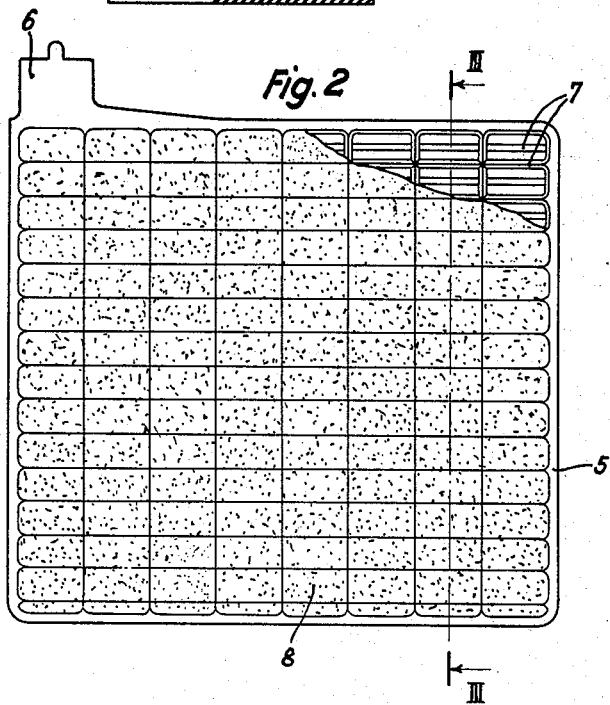
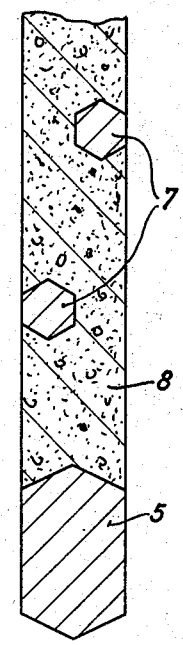
Inventor
Herbert Haebler
by Roy F. Steward
his attorney

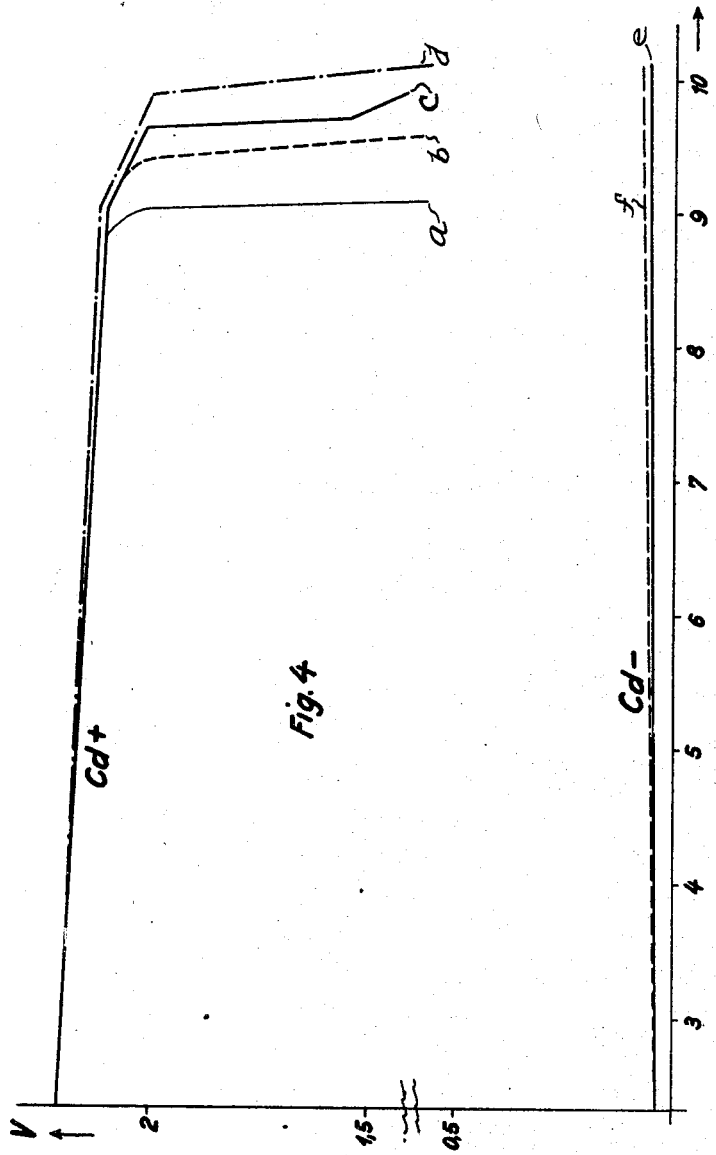

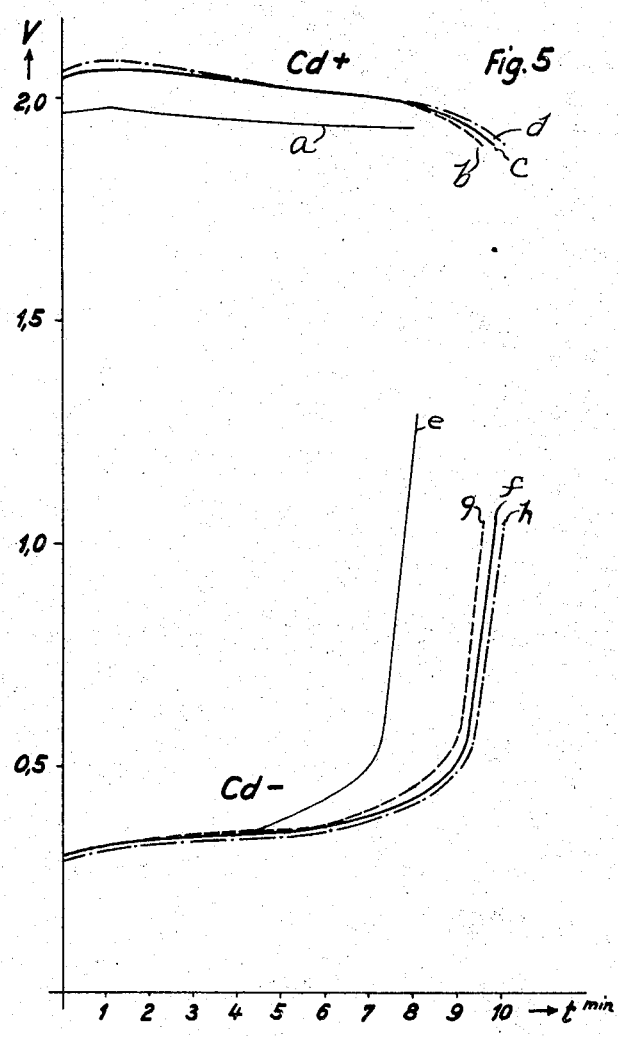

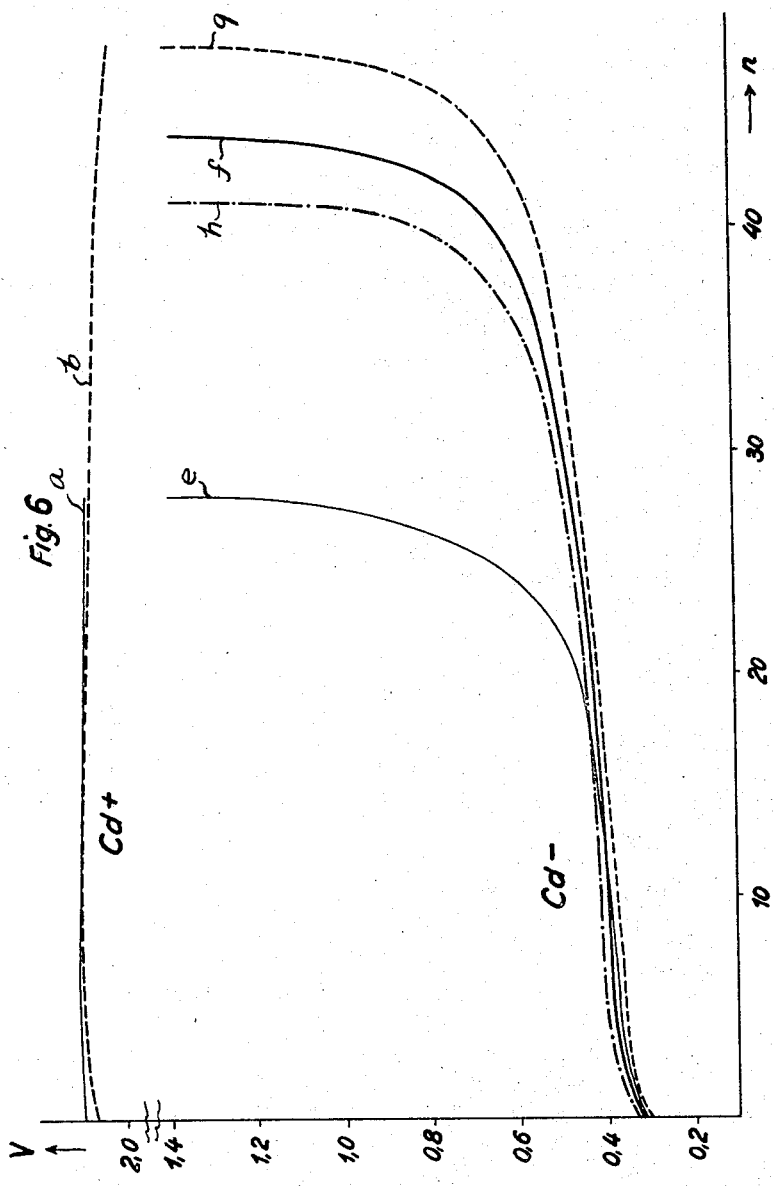

Patented Apr. 27, 1943

2,317,759

UNITED STATES PATENT OFFICE 2,317,759

LEAD STORAGE BATTERY

Herbert Haebler, Stuttgart, Germany; vested in the Alien Property Custodian

Application January 25, 1940, Serial No. 315,613
In Germany January 7, 1939

3 Claims. (Cl. 136—64)

This invention relates to a lead storage battery having grid plates coated with metal.

It is well known in the art to cover with rubber those portions of antimonial lead grids that are not coated with active material to prevent the loss of antimony. It is further known to apply a protective coating of lead dioxide mixed with a plastic substance to the positive plate of a lead storage battery or accumulator or to protect the alloy of antimonial accumulator grids from becoming poor in antimony by giving the grids a thin coat of pure lead, thereby preventing, also, contamination of the electrolyte of sulfuric acid by antimony compounds.

The invention has for its object to provide a lead storage battery the electrodes of which comprise grid plates filled with active mass and in which the positive or the negative grid plates, or both of them, for the purpose of increasing the capacity of the battery, have a coating of metal, except lead, that does not dissolve in the electrolyte of sulfuric acid. Suitable for this purpose are all metals which do not dissolve in the electrolyte, as tin, nickel, copper, mercury, etc., whereas zinc, for instance, which dissolves in sulfuric acid, and, surprisingly, also lead cannot be used, though the latter metal does not dissolve in the acid. The unsuitability of lead in this respect is particularly remarkable in view of the fact that this metal may be advantageously employed in reducing the loss of antimony from the grids of lead storage batteries. Tin, on the other hand, has been found to give excellent results as coating medium. It may be advisable to coat the positive and the negative grids with different metals, and in one embodiment of the invention at least one group of grids is coated with nickel applied upon a copper layer.

Experiments have shown that the maximum increase in capacity is obtainable by coating only one of the groups of positive and negative plates instead of both groups, this group being the one that limits the capacity of the battery by being run down first during discharge. The positive and negative plates are not rendered ineffective simultaneously, and it can be readily determined by test in each instance which one of the two kinds of plates is run down first. It is generally known that the capacity differs according to the manner of discharging, and it has now been ascertained that slow discharge at low current intensities exhausts first the positive plates whilst in case of rapid discharge, particularly of the pulsating type, at high intensities the negative plates are run down first. The invention further provides, therefore, that in storage batteries intended for discharge at low current intensities within longer periods the positive grids are coated with metal and in storage batteries to be discharged at higher intensities in a short time or to be intermittently discharged at high intensities, particularly self-starter batteries, the negative grids only.

The invention is illustrated by way of example in the accompanying drawings, in which Figure 1 is a side view of a lead storage battery;

Fig. 2, a front view of a positive plate of the battery;

Fig. 3, a section on the line III—III, of Fig. 2; and

Figs. 4 to 6 are discharge diagrams.

The storage battery shown in Fig. 1 comprises a hard rubber container 1 which is not affected by sulfuric acid and in which electrode plates are arranged in known manner, the positive plates 3 and the negative plates 2 forming the usual sets. Each cell is shut off on top by a cover provided with borings and possessing an opening, closable by a stopper 4, for pouring in the acid.

As indicated in Figs. 2 and 3, each electrode plate comprises a frame 5 fitted with a lug 6, a small-meshed grid 7 and the paste 8 consisting, in positive plates, largely of lead sulfate mixed with lead peroxide and, in negative plates, of spongy lead. According to the invention, the fine-meshed grid 7, prior to being provided with the active paste, receives a metal coating 9 which does not dissolve in the electrolyte.

The diagram shown in Fig. 4 indicates the influence exerted by tinned grids upon a discharge performed at a current intensity of 7.5 amperes. The time $t$ is plotted in hours on the abscissa and the voltage on the ordinate. The curves represent conditions ascertained at the 26th discharge. The points through which the curve is laid are calculated mean values of three measured cells. The potential of the plates was ascertained by means of a standard cadmium electrode. The diagram shown in Fig. 4 is to be read as having a blank portion omitted or cut away immediately above the figure indicating the voltage 0.5.

Referring to Fig. 4 of the drawings, the upper lines, $a$, $b$, $c$, and $d$, indicate voltage curves of the positive plates of a storage battery having grids made of the usual lead alloy consisting of 93% lead and 7% antimony. The voltage curve $a$ is that obtained with an uncoated grid when used with a negative plate also having its grid uncoated, while the voltage curve, $b$, indicates the voltages obtained when a positive plate with uncoated grid is used with a negative plate having its grid coated with tin. The voltage curve, $c$, shows the result obtained when using a positive plate having its grid tin-coated, with a negative plate also having its grid tin-coated.

The voltage curve $d$ indicates the results obtained when the positive plate has its grid tin-coated but the negative grid has its grid uncoated.

The lower curves in Fig. 4 indicate the voltages measured at the negative plates, the voltage curve, $e$, being that obtained with a negative plate having a tin-coated grid, the voltage curve $f$, is that obtained with a negative plate having a grid which is tin-coated used with a positive plate whose grid is tin-coated.

Fig. 4 further shows that in case of plates having non-tinned grids, at a discharge rate of 7.5 amperes, the positive plate limits the maximum capacity of a lead storage battery. Although the use of grids provided with metal coatings according to the invention does not alter this condition, there is nevertheless an increase in capacity which is greatest in such circumstances when the positive plate, which limits capacity, is tin-coated and this is lessened when the negative plate, also, is thus treated. If both grids are tin-coated, the capacity will represent a mean value resulting from the individual values attained by coating only the positive or the negative grids.

Fig. 5 shows that at a discharge rate of 225 amperes with non-tinned electrode plates (light curves) it is the negative plate that limits maximum capacity. Owing to the greater intensity of the discharge current, the time of discharge $t$ is much shorter. It is entered again in minutes on the abscissa, the voltage being indicated on the ordinate. It will be noted that the application of a coat of tin to the positive or negative grids or to both kinds of grids in accordance with the invention has a powerful effect again upon a rise in capacity. The reference letters, $a$, $b$, $c$, and $d$ designate the voltage curves of the positive plates corresponding to those with the same reference letters used in Fig. 4, and the reference letters $e$ and $f$ designate the voltage curve for the negative plate corresponding to those with the same reference letters in Fig. 4. Two additional voltage curves, $g$ and $h$, are shown in Fig. 5, for the negative plate. The voltage curve, $g$, indicates the results attained at a high rate of discharge, namely, 225 amperes, when the negative plate has its grid coated with tin and the positive plate has its grid uncoated. The voltage curve $h$ indicates the result attained at the same high rate of discharge when using a negative plate whose grid is uncoated, with a positive plate whose grid is coated with tin.

In considering the voltage curves, the nature of the line will indicate the respective positive and negative voltage curves which are to be taken together as designating the action of a given battery. For example, $a$ and $e$, indicate one pair of voltage curves, $b$ and $g$ another, $c$ and $f$ a third pair, and $d$ and $h$ a fourth pair.

The negative plate limits capacity also in case of intermittent discharge at high intensity, which closely approaches conditions prevailing at the starting of self-starter batteries.

Fig. 6 shows the results of experiments made with plates comprising non-tinned and tin-coated grids at intermittent discharge. The curves are distinguished in the manner made use of in Figs. 4 and 5. During the experiments covered by Fig. 6 the discharge was carried out at 260 amperes for 13 seconds, then interrupted for 2½ minutes, resumed again at 260 amperes for 13 seconds, and so forth. The number of pulsations $n$ is shown on the abscissa and the voltage on the ordinate. The curves were plotted at the 25th discharge.

As indicated by the curves of Fig. 6, coating of the grids of electrode plates according to the invention affords in this instance surpassing advantages consisting in very considerable increases in capacity. In this diagram a blank portion is omitted between the horizontal axis and the voltage line 0.2 and also a blank portion is omitted between the voltage lines 1.4 and 2.

The voltage curves of the positive and negative plates as set out in Figs. 4-6 were obtained in accordance with the standard procedure outlined, for example, in the publication entitled "Storage Battery" by George Wood Vinal (1930), see the matter beginning with page 222. As previously stated, the potential of the plates was ascertained by means of a standard cadmium electrode and the index or symbol Cd (cadmium) on the voltage curves in these figures is used to indicate this. In measuring the potential, the voltmeter is connected between the positive (or negative) plate of the lead storage battery and the standard cadmium electrode, which latter is introduced into the electrolyte of the battery before the measurement begins. The difference between the voltage of the positive plates and that of the negative plates gives the practical voltage of the battery.

The metal coats may be applied to the grids by immersion, hot galvanizing, spraying, evaporation or preferably by plating, the thickness of the applied layer of metal being not of decisive importance. The layers are preferably of moderate thickness so as to prevent any material increase in the self-discharge of the batteries, but they must at least firmly adhere to the grids. If nickel is used for coating, firm adhesion to a lead grid may be insured for instance by employing an intermediate layer of copper.

The materials for the grids may comprise the usual grid alloys.

The experimental results illustrated show that the increase in capacity attained by coating the grids with metal becomes particularly apparent when very high discharge currents are taken from the battery as happens for instance in case of self-starter batteries. The rapid exhaustion of a battery was hitherto generally ascribed to the lowering of the sulfuric acid concentration and/or the sintering of the negative mass, but the effects obtained by the application of the invention make it appear probable that the reductions of the capacity occurring in the course of time in a storage battery are largely due to a resistance, a sort of insulating coating, which forms gradually. It remains undecided whether this formation of an insulating coating is identical with the phenomenon known as "sulfating." The metal coatings of the grid plates produce a well conducting surface and thus probably counteract the formation of a capacity diminishing insulating layer. Furthermore, they reduce the charging voltage and increase the voltage on discharge. The life of a set of storage batteries constructed according to the invention is longer than that of a set of batteries of known type. The slight increase in self-discharge which might occur due to the provision of the grids with metal coatings remains within tolerable limits.

The rise in capacity produced according to the invention could be ascertained also at low temperatures, as —10° to —15° C.

I claim:

1. In a storage battery of the lead-acid type, having grids of metal selected from the group consisting of lead, and lead-alloy, filled with active mass to form storage battery grid plates, a group of grid plates each having the entire surface of its grid covered with an outer coating of tin.

2. In a storage battery of the lead-acid type, having grids of metal selected from the group consisting of lead, and lead-alloy, filled with active mass to form storage battery grid plates, a group of positive grid plates each having the entire surface of its grid covered with an outer coating of tin.

3. In a storage battery of the lead-acid type, having grids of metal selected from the group consisting of lead, and lead-alloy, filled with active mass to form storage battery grid plates, a group of negative grid plates each having the entire surface of its grid covered with an outer coating of tin.

HERBERT HAEBLER.